United States Patent [19]

Ridyard

[11] Patent Number: 5,175,261
[45] Date of Patent: Dec. 29, 1992

[54] AZOPYRIDONE DYES

[75] Inventor: Denis R. A. Ridyard, Stockport, England

[73] Assignee: Imperial Chemical Industries PLC, London, England

[21] Appl. No.: 739,099

[22] Filed: Aug. 1, 1991

[30] Foreign Application Priority Data

Aug. 15, 1990 [GB] United Kingdom ............... 9017869

[51] Int. Cl.⁵ .................. C09B 44/08; C09B 62/09; D06P 1/382
[52] U.S. Cl. .................................. 534/631; 534/605; 534/634; 534/635
[58] Field of Search ............. 534/631, 618, 634, 635, 534/605

[56] References Cited

U.S. PATENT DOCUMENTS

| | | | |
|---|---|---|---|
| 3,905,950 | 9/1975 | Crabtree | 534/631 |
| 3,926,944 | 12/1975 | Berrie et al. | 534/634 |
| 4,670,547 | 6/1987 | Lehr | 534/637 |
| 4,866,163 | 9/1989 | Koch | 534/634 |
| 4,963,659 | 10/1990 | Tzikas | 534/618 |

FOREIGN PATENT DOCUMENTS

| | | | |
|---|---|---|---|
| 0372729 | 6/1990 | European Pat. Off. | 534/634 |
| 0377902 | 7/1990 | European Pat. Off. | 534/635 |
| 2141453 | 2/1972 | Fed. Rep. of Germany | 534/634 |
| 57-161175 | 10/1982 | Japan | 534/631 |
| 59-168066 | 4/1984 | Japan | 534/634 |
| 1271226 | 4/1972 | United Kingdom | 534/634 |

OTHER PUBLICATIONS

Chemical Abstracts, vol. 102, No. 8 (Feb. 1985) Abstracts No. 63576u (Sumitomo).

Primary Examiner—Floyd D. Higel
Attorney, Agent, or Firm—Cushman, Darby & Cushman

[57] ABSTRACT

A water-soluble compound of Formula (1) which is useful for coloring e.g. cellulosic materials, animal furs and animal skins such as leather.

$$\left[ X^1-A-N=N \underset{HO}{\overset{T^1}{\underset{\displaystyle\underset{\displaystyle C_nH_{2n}-OR^1}{Z-N-X}}{\bigcirc}}} T^2 \right]-(SO_3H)_p \quad (1)$$

wherein:
A is optionally substituted phenylene or naphthylene;
X is a cellulose-reactive group;
p is greater than or equal to 1;
$T^1$ and $T^2$ are each independently selected from H, CN, $CO_2R^2$, $CONR^2R^3$, $COR^2$, alkyl, aralkyl, cycloalkyl, aryl or a heterocyclic radical, which are unsubstituted or substituted;
Z is a divalent linking group containing from 2 to 6 carbon atoms;
n is from 2 to 6;
$R^1$ is H or sulpho; and
$R^2$ and $R^3$ are each independently H or $C_{1-6}$-alkyl;
and salts thereof.

11 Claims, No Drawings

AZOPYRIDONE DYES

This invention relates to a compound suitable for use as a reactive dye for the coloration of materials having —OH or —NH— groups, to a method for its manufacture and to a method for the coloration of materials using the compound.

According to the present invention there is provided a water-soluble compound of Formula (1) or salt thereof:

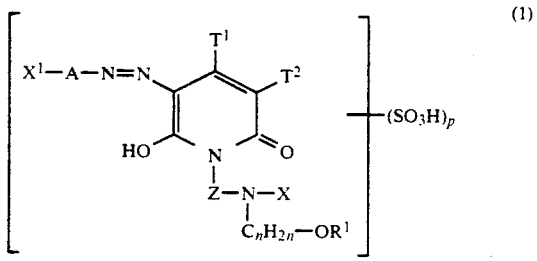

wherein:
A is optionally substituted phenylene or naphthylene;
X is a cellulose-reactive group;
$X^1$ is H or a cellulose-reactive group;
p is greater than or equal to 1;
$T^1$ and $T^2$ are each independently H, CN, $CO_2R^2$, $CONR^2R^3$, $COR^2$, alkyl, aralkyl, cycloalkyl, aryl or a heterocyclic radical;
Z is a divalent linking group containing from 2 to 6 carbon atoms;
n is from 2 to 6;
$R^1$ is H or sulpho;
$R^2$ and $R^3$ are each independently H or $C_{1-6}$-alkyl.

The optional substituents preset on A are preferably selected from —Cl, —Br, —$C_{1-4}$-alkyl, —OH, —O—$C_{1-4}$-alkyl, —CN, —$NO_2$, —$NH_2$ and —NH-$COCH_3$, and especially sulpho and carboxy.

The group represented by $X^1$-A- is preferably a phenyl or naphthyl group having 1, 2 or 3-sulpho substituents. As examples of preferred groups represented by $X^1$-A- there may be mentioned 2-, 3- or 4-sulphophenyl; 2,5- or 2,4-disulphophenyl; 1,5-disulphonaphth-2-yl; 2-methyl-4-sulphophenyl; 2-methoxy-5-sulphophenyl; 4-methoxy-2-sulphophenyl; 2-methyl-5-sulphophenyl; 1-sulphonaphth-2-yl; 1,5,7-trisulphonaphth-2-yl; 3,6,8-trisulphonaphth-2-yl; 4,8-disulphonaphth-2-yl; 6-sulphonaphth-2-yl; 4,8-disulphonaphth-1-yl; and 2,5,7-trisulphonaphth-1-yl.

$T^1$ is preferably $C_{1-4}$-alkyl, especially methyl. $T^2$ is preferably CN, $CO_2R^2$, $CONR^2R^3$, $COR^2$, $C_{1-4}$-alkyl or H, and more especially H or methyl. $R^2$ and $R^3$ are preferably H or $C_{1-4}$-alkyl.

Z is preferably a divalent linking group containing from 2 to 4 carbon atoms such as $C_{1-4}$-alkylene. As examples of Z there may be mentioned —$CH_2CH_2$—, —$CH_2CH_2CH_2$—, —$CH_2CH(CH_3)CH_2$—, and —$CH_2CH_2CH_2CH_2CH_2$—.

It is preferred that n is from 2 to 4, especially 2, and $R^1$ is preferably sulpho.

The compound of the present invention preferably contains a total of at least 3 sulphonic acid groups, more preferably from 3 to 10 sulphonic acid groups.

It will be appreciated that the azo pyridone entity in Formula (1) may exist in tautomeric forms other than that shown, and these are included as an aspect of the present invention.

Although formulae in the present specifiable are drawn in their free acid form it is intended that the invention also relates to the compound in salt form, preferably in their sodium, potassium, lithium or mixed sodium/lithium salt form.

The term "cellulose-reactive group" means a group whose presence in the compound renders it capable of forming a covalent bond with —OH or —NH— groups present in textile materials, especially in the presence of alkali, such as cotton, jute, hemp, and flax, or in leather.

The cellulose-reactive group is preferably a heterocyclic radical having two or three nitrogen atoms in the heterocyclic ring and at least one labile substituent attached to a carbon atom in the heterocyclic ring. The preferred cellulose-reactive groups are of the pyrimidinyl and triazinyl series. A labile substituent is one capable of being replaced by nucleophilic substitution during exhaust dyeing to form a covalent bond between the heterocyclic ring and a nucleophile. Preferred labile substituents include fluorine, bromine, and especially chlorine and quaternary ammonium groups.

When $X^1$ is a heterocyclic radical having two or three nitrogen atoms in the heterocyclic ring it is preferably attached to A via an amino group. As specific examples of such cellulose-reactive heterocyclic radicals there may be mentioned 5- or 6-(sulphonyl or carbonyl)-2,3-dichloroquinoxaline;
6- or -7-sulphonyl-2,4-dichloroquinazoline;
7- or -8-sulphonyl-2,4,6-trichloroquinazoline;
6-sulphonyl-2,4,7- or 2,4,8-trichloroquinazoline;
6-carbonyl-2,4-dichloroquinazoline;
6-carbonyl-1,4-dichlorophthalazine;
4,5-dichloropyridazinyl;
5-carbonyl-2,4-dichloropyrimidine;
1-(phenyl-4'-carbonyl)-4,5-dichloropyridazone;
1-(phenyl-4'-sulphonyl)-4,5-dichloropyridazone;
2,4- and/or 2,6-dichloro- (or bromo)-pyridin-6-(and/or -4)yl;
trichloropyrimidinyl;
tribromopyridinyl;
dichloro-5-(cyano, nitro, methyl or methoxycarbonyl)-pyrimidinyl;
4-carbonyl-2-methylsulphonyl-6-chloropyrimidine;
5-chloro-6-methyl-2-methylsulphonylpyrimidin-4-yl.

It is preferred that the cellulose reactive groups in compounds of the present invention are each independently an s-triazin-2-yl group having a labile substituent on one or both of the 4- and 6-positions. In this instance a wide range of labile substituents are envisaged, such as activated aryloxy or various groups linked through a sulphur atom and halo substituents, but the preferred labile substituents are F or Br, and especially Cl or a quaternary ammonium group. As examples of quaternary ammonium groups there may be mentioned tri-lower alkyl ammonium, e.g. $(CH_3)_3N^+$— and optionally substituted pyridinium groups especially those derived from pyridine carboxylic acids in particular from nicotinic acid and isonicotinic acid.

When the s-triazin-2-yl group has a labile substituent on only one of the 4- or 6-positions then the remaining 4- or 6-position is substituted by a non-labile substituent, such as a non-reactive substituent, or is linked via a diamino linking group to another cellulose reactive group. The diamino linking group is preferably a group of the formula —$N(R^4)$—L—$N(R^5)$— wherein L is a divalent organic linking group, $R^4$ and $R^5$ are each independently selected from H and $C_{1-4}$-alkyl, or $R^4$ and $R^5$ together with —N—L—N— form a 5 or 6 membered ring, which is preferably a piperazine ring.

As examples of non-reactive substituents there may be mentioned alkylthio groups, alkoxy groups and optionally substituted amino groups. Preferred forms of these non-reactive substituents include $C_{1-4}$-alkoxy groups such as methoxy, ethoxy, n-propoxy, isopropoxy and butoxy, and $C_{1-4}$-alkoxy-$C_{1-4}$-alkoxy groups such as beta-methoxy-ethoxy and beta-ethoxyethoxy; $C_{1-4}$-thioalkyl groups; —$NH_2$; $C_{1-4}$-alkylamino groups such as methylamino, ethylamino and butylamino, di($C_{1-4}$-alkyl)amino groups such as dimethylamino, diethylamino, N-methyl-N-ethylamino and dibutylamino; alkylamino groups which are substituted by, for example, OH, CN, halo or sulpho, such as beta-hydroxyethylamino, di(beta-hydroxyethyl)amino, beta-cyanoethylamino, di(beta-cyanoethyl)amino, beta-sulphoethylamino, beta-hydroxypropylamino, N-(beta-hydroxybutyl)-N-ethylamino and N-(beta-hydroxyethyl)-N-methylamino; cycloalkylamino such as cyclohexylamino; cyclic amino groups such as morpholino and piperazino; naphthylamino substituted by 1, 2 or 3 sulpho groups; and optionally substituted phenylamino groups.

An especially preferred form of the non-reactive optionally substituted phenylamino group is of the Formula (2):

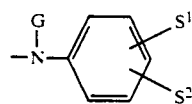

wherein G is H, methyl, ethyl, sulphomethyl, 2-carboxy-, 2-hydroxy- or 2-cyanoethyl and $S^1$ and $S^2$ are each independently selected from $CH_3$, $C_2H_5$, $OCH_3$, $OC_2H_5$, Cl, Br, CN, $NO_2$, $NHCOCH_3$ and especially H, carboxy and sulpho.

As specific examples of non-reactive optionally substituted groups of Formula (2) there may be mentioned anilino,
o-, m- or p-sulphoanilino
o-, m- or p-carboxyanilino,
4- or 5-sulpho-2-carboxyanilino,
4- or 5-sulpho-o-tolylamino,
2,4- 2,5- or 3,5-disulphoanilino,
2,4-dicarboxyanilino,
4- or 5-sulpho-2-methoxyanilino,
N-methyl-o-, m- or p-sulphoanilino,
N-omega-sulphomethylanilino,
N-(beta-hydroxyethyl)-3-sulphoanilino.

Further classes of compounds according to the present invention include a compound of Formula (1) in which X is of formula —L—$SO_2CH_2CH_2OSO_3H$ or —L—$SO_2CH=CH$ wherein L is a divalent organic linking group and those in which $X^1$ is H or $SO_2CH_2CH_2OSO_3H$ or $SO_2CH=CH$.

The identity of the divalent organic linking group L is not critical providing it does not adversely interfere with the performance of the dyestuff. As examples of divalent organic linking groups represented by L there may be mentioned:
(a) divalent aliphatic radicals, preferably those containing from 2 to 6 carbon atoms, such as ethylene, trimethylene, methylethylene, tetramethylene, alpha:beta-dimethylethylene and hexamethylene radicals;
(b) divalent aromatic radicals in which at least one of the terminal links is through an aliphatic carbon atom, for example as in the divalent benzyl —$C_6H_4.CH_2$— or the xylylene —$CH_2C_6H_4CH_2$— group;
(c) divalent monocyclic or fused polycyclic aromatic radicals, for example optionally substituted phenylene or optionally substituted naphthylene such as

| | |
|---|---|
| 1,3- or 1,4-phenylene | 2-nitro-1,4-phenylene |
| 3-sulpho-1,4-phenylene | 4-methoxy-1,3-phenylene |
| 4-sulpho-1,3-phenylene | 4-nitro-1,3-phenylene |
| 2-carboxy-1,4-phenylene | 2-chloro-1,4-phenylene |
| 4-carboxy-1,3-phenylene | 3,7-disulpho-1,5-naphthylene |
| 2-methoxy-1,4-phenylene: | |

(d) divalent radicals wherein the terminal bonds are attached to carbon atoms of two phenyl or naphthalene nuclei which are joined together either through a direct link or through an atom or chain of atoms which optionally form a homocyclic or heterocyclic ring, for example radicals of the formula:

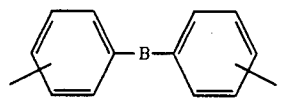

wherein B is —S—, —O—, —$SO_2$—, —CO—, —$CH_2$—, —$CH_2CH_2$—, —NH—, —NHCONH—, a direct link or preferably —CH=CH—.

As will be understood, a homocyclic ring is a ring of carbon atoms, and a heterocyclic ring is a ring containing at least one hetero atom, such as O, N or S.

As specific examples of divalent radicals defined in (d) there may be mentioned divalent:

| | |
|---|---|
| diphenyl | azobenzene |
| diphenyloxide | diphenyloxadiazole |
| diphenylamine | benzanilide |
| diphenylsulphide | diphenylurea |
| diphenylsulphone | 1,2-bis(phenylcarbamyl)ethylene |
| diphenylmethane | 1,4-bis-(phenylcarbamyl)butadiene |
| diphenylketone | 1,2-bis-(phenylcarbamyl)ethane |
| diphenylethane | 1,3-bis-(phenylcarbamyl)propane |
| diphenylethylene | stilbene; and |

(e) nuclear substituted derivatives of the above, for example, containing COOH, methyl, nitro, chloro, sulpho atoms or groups as substituents on the phenyl or naphthalene nuclei.

When the cellulose-reactive group X in the compound of Formula (1) is S-traizin-2-yl having a labile group substituent on one ring carbon atom, and the other ring carbon atom is linked via a diamino linking group to another cellulose-reactive group, the compound is preferably of Formula (3).

Accordingly the present invention provides a compound which, in the free acid form, if of Formula (3):

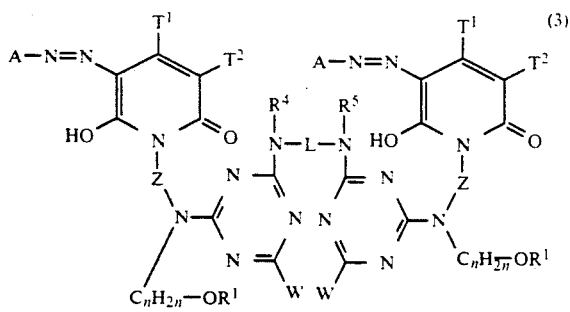

wherein
each A, $T^1$, $T^2$, Z, n, $R^1$, $R^4$, $R^5$ and L independently is as hereinbefore defined; and W is a labile substituent.

It is preferred that L is 2,2'-disulphostilben-4,4'-yl and that W is halo or quaternary ammonium, especially chloro, nicotin-1-yl or iso-nicotin-1-yl.

Although the two groups attached to L in Formula (3) can be different it is preferred that they are identical.

In a compound of Formula (3) it is preferred that each A independently is a phenyl or naphthyl group optionally having one or more, preferably from 1 to 3, substituents selected from —Cl, —Br, —$C_{1-4}$-alkyl, hydroxy, —O—$C_{1-4}$-alkyl, —CN, —$NO_2$, —$NH_2$ and —$NHCOCH_3$ and especially —H, -sulpho and -carboxy.

As examples of amines of the formula A—$NH_2$, from which A may be derived, there may be mentioned

| | |
|---|---|
| aniline. | 2-sulpho-4-methylaniline. |
| aniline-2-sulphonic acid. | 2-sulpho-5-methylaniline. |
| aniline-3-sulphonic acid. | 2-methoxy-5-sulphoaniline. |
| aniline-4-sulphonic acid. | 2-sulpho-4-methoxyaniline. |
| aniline-2,4-disulphonic acid. | 2-chloro-4-sulphoaniline. |
| aniline-2,5-disulphonic acid. | 2,5-dichloro-4-sulphoaniline. |
| aniline-3,5-disulphonic acid. | 2-chloro-5-sulphoaniline. |
| 2-methyl-4-sulphoaniline. | 2-sulpho-4-nitroaniline. |
| 2-methyl-5-sulphoaniline. | 2-sulpho-5-nitroaniline. |
| 2-carboxy-5-sulphoaniline. | |
| 2-aminonaphthalene-1,5-disulphonic acid. | |
| 2-aminonaphthalene-1-sulphonic acid. | |
| 2-aminonaphthalene-1,5,7-trisulphonic acid. | |
| 2-aminonaphthalene-3,6,8-trisulphonic acid. | |
| 2-aminonaphthalene-4,8-disulphonic acid. | |
| 2-aminonaphthalene-5,7-disulphonic acid. | |
| 2-aminonaphthalene-6-sulphonic acid. | |
| 1-aminonaphthalene-4-sulphonic acid. | |
| 1-aminonaphthalene-5-sulphonic acid. | |
| 1-aminonaphthalene-6-sulphonic acid. | |
| 1-aminonaphthalene-7-sulphonic acid. | |
| 1-aminonaphthalene-4,8-disulphonic acid. | |
| 1-aminonaphthalene-3,8-disulphonic acid. | |
| 1-aminonaphthalene-2,5,7-trisulphonic acid, and | |
| 1-aminonaphthalene-3,5,7-trisulphonic acid. | |

It has been found that compositions containing two compounds of Formula (1) which are identical except that in the first compound $R^1$ is H and in the second compound $R^1$ is sulpho also are of a value for the coloration of cellulosic textile materials or leathers.

Accordingly, a second aspect of the invention relates to compositions containing a first and second compound of Formula (1) wherein $X^1$, A, $T^1$, $T^2$, Z, X, p and n are the same in the first and second compound, and $R^1$ in the first compound is H and $R^1$ in the second compound is sulpho.

In mixtures of the second aspect of the invention the ratio of compound in which $R^1$ is H to the compound in which $R^1$ is sulpho may be varied between wide limits, depending upon the conditions employed when preparing the dyes. It is preferred that the ratio of compound in which $R^1$ is H to compound in which $R^1$ is sulpho is in the range of 90:10 to 10:90, more preferably 90:10 to 50:50, especially 80:20 to 70:30, and more especially about 75:25.

A compound and mixtures of compounds according to the invention wherein $X^1$, A, X, $R^1$, $R^4$, $R^5$, $T^1$, $T^2$, n and L are as hereinbefore defined can be prepared by diazotising an amine of formula $X^1$—A—$NH_2$ and coupling to a compound of mixture of compounds of Formula (4)

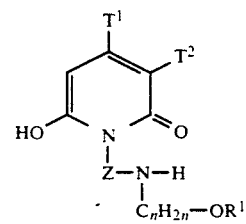

followed by condensation with a cellulose-reactive compound of formula X—$X^2$ in which X is as defined above and $X^2$ is a labile group capable of being displaced by nucleophilic substitution.

A compound of Formula (1) in which the component $R^1$ is sulpho can be prepared by purifying mixtures of compounds containing $R^1$=H and $R^1$=sulpho, for example using chromatographic techniques such as preparative HPLC.

In the above process it is convenient to use a mixture of compounds of Formula (4) in which $R^1$ is H and $SO_3H$ in the ratio of 10:90 to 90:10, preferably in the range of 90:10 to 50:50, especially in the range 80:20 to 70:30, more especially about 75:25.

A convenient process for preparing a compound of Formula (4) in which $R^1$ is sulpho is by stirring the corresponding compound in which $R^1$ is H in 98% sulphuric acid at a temperature of 0°–5° C.

A preferred process for preparing the mixtures of Formula (4) in which $T^2$ is H or $C_{1-4}$-alkyl and in which $R^1$ is sulpho and H is by stirring the corresponding 3-cyanopyridone of Formula (5) (wherein $R^1$ is H) in 78% sulphur acid at a temperature of above 100° C., especially 125°–1352 C., for several hours, preferably approximately 3 hours.

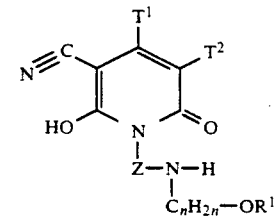

This typically produces a mixture in which the ratio of $R^1$=H to $R^1$=sulpho is in the range of 80:20 to 70:30. Mixtures in which the percentage of the component in which $R^1$=H is decreased and the percentage of $R^1$=sulpho is increased can be made by stirring the mixture of Formula (5) (obtained as described above by treatment with 78% sulphuric acid) in 20% oleum at 0°–5° C.

Mixtures in which the percentage of the compound in which $R^1$ is sulpho is increased can also be made by taking the dyebase obtained by diazotising an amine of formula $X^1ANH_2$ and coupling to a mixture of Formula (4) and stirring this in 98% sulphuric acid at 0°-5° C.

A compound of mixtures of Formula (3) in which the two groups attached to L are identical can be conveniently prepared by diazotisation of an amine of formula A—$NH_2$, coupling to a compound or mixture of Formula (4) to give an azo pyridone. An amine of formula $HN(R^4)$—L—$N(R^5)H$ is condensed with at least two equivalents of triazine compound having a group represented by W on each ring carbon atom, and the product condensed, preferably in the presence of base, with approximately two equivalents of the above azo pyridone to give a compound of mixture of Formula (3).

A compound or mixture of compounds of Formula (3) in which the two groups attached to L are different can be prepared by independently diazotising two different amines of formula A—$NH_2$, independently coupling these amines to compounds or mixtures of Formula (4) to give different azo pyridones which are condensed with an amine as described above to give a mixture from which can be isolated a compound or mixture of Formula (3) in which the two groups attached to L are different.

It is preferred that (i) the group W in the above processes is halo, especially chloro, and, (ii) when W in the final dyestuff is quaternary ammonium, this is prepared by reacting the product of the above processes with the appropriate amine.

The compound of the invention is characterised by its good dyeing properties, and in particular its substantivity, fixation efficiency and build up when applied to cellulosic materials. A particularly notable feature of a dye of the present invention is its good stability under alkaline conditions used during exhaust dyeing.

According to a further aspect of the present invention there is provided a process for the coloration of materials, particularly materials having a —OH or —NH— group, such as cellulosic material (e.g. cotton), an animal fur, or an animal skin (e.g. leather), by applying thereto a compound of Formula (1) or of Formula (3), or a composition containing at least two compounds of Formula (1) or of Formula (3). A still further aspect of the invention comprises such materials when dyed with a compound or composition of Formula (1) or Formula (3).

The invention is further illustrated by the following Examples in which all parts and percentages are by weight unless otherwise indicated.

EXAMPLE 1

Preparation of the compound of Formula (6) in which W is Cl

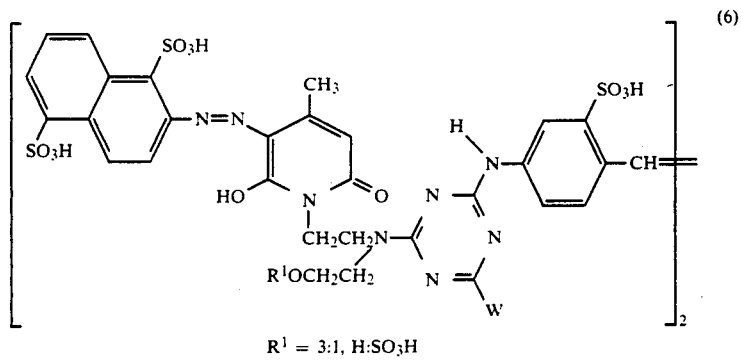

$R^1 = 3:1, H:SO_3H$ (i) Diazotisation 81.4 Parts of 2-aminonaphthalene-1,5-disulphonic acid were added to 1500 parts of water and 40 parts of hydrochloric acid (S.G. 1.18) and the mixture cooled to 0°-5° C. with stirring. 101 Parts of 2N sodium nitrite solution were added dropwise over 1 hour. The slight excess of nitrous acid was then destroyed by the addition of 10% aqueous sulphamic acid to give a yellow diazo suspension.

(ii) Preparation of coupling component

50 Parts of 1-beta-(hydroxyethylamino)ethyl-3-cyano-6-hydroxy-4-methyl-2-oxo-1H-pyridine were added to 80 parts of well stirred 78% sulphuric acid at such a rate that the temperature did not exceed 40° C. The mixture was then heated to 130° C. and stirred at 130°±5° C. for 3 hours before cooling to ambient temperature and adding to 2000 parts of ice water. The resultant sulphuric acid solution contained a mixture of 1-beta-(hydroxyethylamino)ethyl-6-hydroxy-4-methyl-2-oxo-1H-pyridine and 1-beta-(sulphatoethylamino)ethyl-6-hydroxy-4-methyl-2-oxo-1H-pyridine in the ratio of approximately 3:1.

(iii) Coupling

The above yellow diazo suspension from stage (i) was added to the sulphuric acid solution from stage (ii) and the mixture stirred for 4 hours at 0°-5° C. without pH adjustment. After allowing the temperature to rise to ambient the pH was adjusted to 7 with sodium hydroxide, 15% w/v sodium chloride was added and stirring continued for a further 1 hour. The precipitated solid was collected by filtration, reslurried in water and dialysed to remove inorganic salts. The suspension was then evaporated to dryness to give an azopyridone dyebase.

(iv) Preparation of linking group

30 Parts of 4,4'-diaminostilbene-2,2'-disulphonic acid were suspended in 500 parts of water and the pH adjusted to 7 with sodium hydroxide. The solution was added to a stirred suspension of 40.6 parts of cyanuric chloride in 40 parts of acetone and 150 parts of ice. The mixture was stirred for a further 1½ hours whilst maintaining the pH between 6.5 and 7 with 2N sodium carbonate solution as required. The precipitate solid was collected by filtration, washed with ice cold water and reslurried in acetone. The product was again collected by filtration, washed with acetone, dried and mixed with 10 parts of mixed phosphate buffer (2 parts of potassium dihydrogen phosphate and 1 part of disodium hydrogen phosphate) to give 4,4'-bis-dichlorotriazinylaminostilbene-2,2'-disulphonic acid.

(v) Condensation of azopyridone dyebase and linking group

10 Parts of 4,4'-bis-dichlorotriazinylaminostilbene-2,2'-disulphonic acid from step (iv) were added to 11 parts of the above azopyridone dyebase from step (iii) in 800 parts of water and the mixture stirred at ambient temperature whilst maintaining the pH between 6.5 and 7 with 2N sodium carbonate as required. After stirring for 4 hours at pH 6.5-7 the temperature was increased to 40° C. and stirring continued for a further 12 hours to complete the condensation. The solution was concentrated to 150 parts and 10% w/v sodium chloride added. The title product was precipitated as a solid and collected by filtration, washed with acetone and dried.

When applied to cellulose fibres in conjunction with an acid binding agent, the fibres were dyed in bright greenish-yellow shades having good fastness to wet treatments and to light.

EXAMPLE 2

Preparation of compound of Formula (6) in which W is 3-carboxypyridinium

To a suspension of 77.5 parts of the product of Example 1 in 1000 parts of water were added a solution ob 12.3 parts of nicotinic acid in 500 parts of water at pH 7. The stirred mixture was then heated to 80° C. whilst maintaining the pH between 6.7 and 7. Heating at 80° C. was continued for a further 24 hours after which time no starting material of Formula (6) in which W is Cl remained (according to HPLC analysis). The solution was concentrated, dialysed and evaporated to dryness to give the title product.

When the title product was applied to cellulose fibres in conjunction with an acid binding agent, the fibres were dyed in strong bright greenish-yellow shades having good build-up and good fastness to wet treatments and to light.

EXAMPLE 3

Preparation of compound of Formula (6) in which W is 4-carboxypyridinium

The 12.3 parts of nicotinic acid in Example 2 can be replaced with 12.3 parts of iso-nicotinic acid to give a dyestuff having similar properties.

EXAMPLE 4

When the dyestuff prepared in Example 1 is applied to leather under slightly acidic conditions a bright greenish-yellow shade is obtained with excellent fastness to wet treatments and to light.

EXAMPLE 5 to 44

Further dyes of the invention can be prepared by diazotising the amine listed in column 1, coupling with the mixed pyridines listed in column 2, followed by condensation with the compound listed in column 3, reaction with the amine on linking group listed in column 4, and quaternisation using an analogous method to that described in Example 2 with the reagent listed in column 5.

| Example | 1 | 2 | 3 | 4 | 5 |
|---|---|---|---|---|---|
| 5 | Aniline-2-sulphonic acid | 1-beta-(hydroxyethylamino)ethyl-6-hydroxy-4-methyl-2-oxo-1H pyridine (I) 1-beta-(sulphatoethylamino)ethyl-6-hydroxy-4-methyl-2-oxo-1H pyridine (II) I 70% II 30% | Cyanuric Chloride | 4,4'-diaminostilbene 2,2'-disulphonic acid | nicotinic acid |
| 6 | Aniline-3-sulphonic acid | 1-beta-(hydroxyethylamino)ethyl-6-hydroxy-4-methyl-2-oxo-1H pyridine (I) 1-beta-(sulphatoethylamino)ethyl-6-hydroxy-4-methyl-2-oxo-1H pyridine (II) I 70% II 30% | Cyanuric Chloride | 4,4'-diaminostilbene 2,2'-disulphonic acid | iso-nicotinic acid |
| 7 | Aniline-4-sulphonic acid | 1-beta-(hydroxyethylamino)ethyl-6-hydroxy-4-methyl-2-oxo-1H pyridine (I) 1-beta-(sulphatoethylamino)ethyl-6-hydroxy-4-methyl-2-oxo-1H pyridine (II) I 70% II 30% | Cyanuric Chloride | 4,4'-diaminostilbene 2,2'-disulphonic acid | nicotinic acid |
| 8 | Aniline-2,5-disulphonic acid | 1-beta-(hydroxyethylamino)ethyl-6-hydroxy-4-methyl-2-oxo-1H pyridine (I) 1-beta-(sulphatoethylamino)ethyl-6-hydroxy-4-methyl-2-oxo-1H pyridine (II) I 70% II 30% | Cyanuric Chloride | 4,4'-diaminostilbene 2,2'-disulphonic acid | nicotinic acid |
| 9 | Aniline-2,4-disulphonic acid | 1-beta-(hydroxyethylamino)ethyl-6-hydroxy-4-methyl-2-oxo-1H pyridine (I) 1-beta-(sulphatoethylamino)ethyl-6-hydroxy-4-methyl-2-oxo-1H pyridine (II) I 70% II 30% | Cyanuric Chloride | 4,4'-diaminostilbene 2,2'-disulphonic acid | nicotinic acid |
| 10 | 2-aminonaphthalene-1,5-disulphonic acid | 1-beta-(hydroxyethylamino)ethyl-6-hydroxy-4-methyl-2-oxo-1H pyridine (I) | Cyanuric Chloride | ethylene diamine | nicotinic acid |

-continued

| Example | 1 | 2 | 3 | 4 | 5 |
|---|---|---|---|---|---|
| | | 1-beta-(sulphatoethylamino)ethyl-6-hydroxy-4-methyl-2-oxo-1H pyridine (II) I 70% II 30% | | | |
| 11 | 2-aminonaphthalene-1,5-disulphonic acid | 1-beta-(hydroxyethylamino)ethyl-6-hydroxy-4-methyl-2-oxo-1H pyridine (I) 1-beta-(sulphatoethylamino)ethyl-6-hydroxy-4-methyl-2-oxo-1H pyridine (II) I 70% II 30% | Cyanuric Chloride | 1,4-phenylene diamine | — |
| 12 | 2-aminonaphthalene-1,5-disulphonic acid | 1-beta-(hydroxyethylamino)ethyl-6-hydroxy-4-methyl-2-oxo-1H pyridine (I) 1-beta-(sulphatoethylamino)ethyl-6-hydroxy-4-methyl-2-oxo-1H pyridine (II) I 70% II 30% | Cyanuric Chloride | 1,4-phenylene diamine | iso-nicotinic acid |
| 13 | 2-aminonaphthalene-1,5-disulphonic acid | 1-beta-(hydroxyethylamino)ethyl-6-hydroxy-4-methyl-2-oxo-1H pyridine (I) 1-beta-(sulphatoethylamino)ethyl-6-hydroxy-4-methyl-2-oxo-1H pyridine (II) I 70% II 30% | Cyanuric Chloride | 1,3-phenylene diamine | iso-nicotinic acid |
| 14 | 2-aminonaphthalene-1,5-disulphonic acid | I 50% II 50% | Cyanuric Chloride | 4,4'-diaminostilbene 2,2'-disulphonic acid | iso-nicotinic acid |
| 15 | 2-aminonaphthalene-1,5-disulphonic acid | I 80% II 20% | Cyanuric Chloride | 1,4-phenylenediamine-3-sulphonic acid | nicotinic acid |
| 16 | 2-aminonaphthalene-1,5-disulphonic acid | I 80% II 20% | Cyanuric Chloride | 4,4'-diamino-benzanilide | nicotinic acid |
| 17 | 2-aminonaphthalene-1,5-disulphonic acid | I 80% II 20% | Cyanuric Chloride | 4,4'-diaminodiphanyl 2,2'-disulphonic acid | nicotinic acid |
| 18 | 2-aminonaphthalene-1,5-disulphonic acid | 1-beta-(hydroxyethylamino)ethyl-6-hydroxy-3,4-di methyl-2-oxo-1H pyridine (I) 1-beta-(sulphatoethylamino)ethyl-6-hydroxy-3,4-di methyl-2-oxo-1H pyridine (II) I 70% II 30% | Cyanuric Chloride | 4,4'-diaminostilbene 2,2'-disulphonic acid | iso-nicotinic acid |
| 19 | 2-methylaniline-5-sulphonic acid | 1-beta-(hydroxyethylamino)ethyl-6-hydroxy-3,4-di methyl-2-oxo-1H pyridine (I) 1-beta-(sulphatoethylamino)ethyl-6-hydroxy-3,4-di methyl-2-oxo-1H pyridine (II) I 70% II 30% | Cyanuric Chloride | 4,4'-diaminostilbene 2,2'-disulphonic acid | iso-nicotinic acid |
| 20 | 2-methylaniline-5-disulphonic acid | 1-beta-(hydroxyethylamino)ethyl-6-hydroxy-3,4-di methyl-2-oxo-1H pyridine (I) 1-beta-(sulphatoethylamino)ethyl-6-hydroxy-3,4-di methyl-2-oxo-1H pyridine (II) I 70% II 30% | Cyanuric Chloride | 4,4'-diaminostilbene 2,2'-disulphonic acid | iso-nicotinic acid |
| 21 | Aniline-2,5-disulphonic acid | 1-beta-(hydroxyethylamino)ethyl-6-hydroxy-3,4-di methyl-2-oxo-1H pyridine (I) 1-beta-(sulphatoethylamino)ethyl-6-hydroxy-3,4-di methyl-2-oxo-1H pyridine (II) I 70% II 30% | Cyanuric Chloride | 4,4'-diaminostilbene 2,2'-disulphonic acid | nicotinic acid |
| 22 | 2-methoxyaniline-5-sulphonic acid | 1-beta-(hydroxyethylamino)ethyl-6-hydroxy-3,4-di methyl-2-oxo-1H pyridine (I) 1-beta-(sulphatoethylamino)ethyl-6-hydroxy-3,4-di methyl-2-oxo-1H pyridine (II) I 70% II 30% | Cyanuric Chloride | 4,4'-diaminostilbene 2,2'-disulphonic acid | nicotinic acid |
| 23 | 4-methoxyaniline-2-sulphonic acid | 1-beta-(hydroxyethylamino)ethyl-6-hydroxy-3,4-di | Cyanuric Chloride | 4,4'-diaminostilbene 2,2'-disulphonic | iso-nicotinic acid |

-continued

| Example | 1 | 2 | 3 | 4 | 5 |
|---|---|---|---|---|---|
| | | methyl-2-oxo-1H pyridine (I) 1-beta-(sulphatoethylamino) ethyl-6-hydroxy-3,4-di methyl-2-oxo-1H pyridine (II) I 70% II 30% | | acid | |
| 24 | 2-aminonaphthalene-1,5-disulphonic acid | 1-beta-(hydroxyethylamino) ethyl-6-hydroxy-4-methyl-2-oxo-1H pyridine (I) 1-beta-(sulphatoethylamino) ethyl-6-hydroxy-4-methyl-2-oxo-1H pyridine (II) I 70% II 30% | Cyanuric Chloride | Aniline-2-sulphonic acid | nicotinic acid |
| 25 | 2-aminonaphthalene-1,5-disulphonic acid | 1-beta-(hydroxyethylamino) ethyl-6-hydroxy-4-methyl-2-oxo-1H pyridine (I) 1-beta-(sulphatoethylamino) ethyl-6-hydroxy-4-methyl-2-oxo-1H pyridine (II) I 70% II 30% | Cyanuric Chloride | Aniline-3-sulphonic acid | nicotinic acid |
| 26 | 2-aminonaphthalene-1,5-disulphonic acid | 1-beta-(hydroxyethylamino) ethyl-6-hydroxy-4-methyl-2-oxo-1H pyridine (I) 1-beta-(sulphatoethylamino) ethyl-6-hydroxy-4-methyl-2-oxo-1H pyridine (II) I 70% II 30% | Cyanuric Chloride | Aniline-4-sulphonic acid | nicotinic acid |
| 27 | 2-aminonaphthalene-1,5-disulphonic acid | 1-beta-(hydroxyethylamino) ethyl-6-hydroxy-4-methyl-2-oxo-1H pyridine (I) 1-beta-(sulphatoethylamino) ethyl-6-hydroxy-4-methyl-2-oxo-1H pyridine (II) I 70% II 30% | Cyanuric Chloride | 2-carboxyaniline-4-sulphonic acid | iso-nicotinic acid |
| 28 | 2-aminonaphthalene-1,5-disulphonic acid | 1-beta-(hydroxyethylamino) ethyl-6-hydroxy-4-methyl-2-oxo-1H pyridine (I) 1-beta-(sulphatoethylamino) ethyl-6-hydroxy-4-methyl-2-oxo-1H pyridine (II) I 70% II 30% | Cyanuric Chloride | 2-carboxyaniline-5-sulphonic acid | iso-nicotinic acid |
| 29 | 2-aminonaphthalene-1-disulphonic acid | 1-beta-(hydroxyethylamino) ethyl-6-hydroxy-4-methyl-2-oxo-1H pyridine (I) 1-beta-(sulphatoethylamino) ethyl-6-hydroxy-4-methyl-2-oxo-1H pyridine (II) I 70% II 30% | Cyanuric Chloride | 2-carboxyaniline-5-sulphonic acid | iso-nicotinic acid |
| 30 | 2-aminonaphthalene-1-disulphonic acid | 1-beta-(hydroxyethylamino) ethyl-6-hydroxy-4-methyl-2-oxo-1H pyridine (I) 1-beta-(sulphatoethylamino) ethyl-6-hydroxy-4-methyl-2-oxo-1H pyridine (II) I 70% II 30% | Cyanuric Chloride | Aniline-2,4-di-sulphonic acid | iso-nicotinic acid |
| 31 | 2-aminonaphthalene-1-disulphonic acid | 1-beta-(hydroxyethylamino) ethyl-6-hydroxy-4-methyl-2-oxo-1H pyridine (I) 1-beta-(sulphatoethylamino) ethyl-6-hydroxy-4-methyl-2-oxo-1H pyridine (II) I 70% II 30% | Cyanuric Chloride | Aniline-2,5-di-sulphonic acid | nicotinic acid |
| 32 | 2-aminonaphthalene-1-disulphonic acid | 1-beta-(hydroxyethylamino) ethyl-6-hydroxy-4-methyl-2-oxo-1H pyridine (I) 1-beta-(sulphatoethylamino) ethyl-6-hydroxy-4-methyl-2-oxo-1H pyridine (II) I 70% II 30% | Cyanuric Chloride | 2-methylaniline-4-sulphonic acid | nicotinic acid |
| 33 | 2-aminonaphthalene-1,5-disulphonic acid | 1-beta-(hydroxyethylamino) ethyl-6-hydroxy-4-methyl-2-oxo-1H pyridine (I) 1-beta-(sulphatoethylamino) ethyl-6-hydroxy-4-methyl-2-oxo-1H pyridine (II) I 70% II 30% | Cyanuric Chloride | 2-methylaniline-5-sulphonic acid | nicotinic acid |
| 34 | 2-aminonaphthalene-1,5-disulphonic acid | 1-beta-(hydroxyethylamino) ethyl-6-hydroxy-4-methyl-2-oxo-1H pyridine (I) 1-beta-(sulphatoethylamino) | Cyanuric Chloride | 2-methylaniline | nicotinic acid |

| Example | 1 | 2 | 3 | 4 | 5 |
|---|---|---|---|---|---|
| 35 | 2-aminonaphthalene-1,5-disulphonic acid | ethyl-6-hydroxy-4-methyl-2-oxo-1H pyridine (II) I 70% II 30% 1-beta-(hydroxyethylamino) ethyl-6-hydroxy-4-methyl-2-oxo-1H pyridine (I) 1-beta-(sulphatoethylamino) ethyl-6-hydroxy-4-methyl-2-oxo-1H pyridine (II) I 70% II 30% | Cyanuric Chloride | N-methylaniline | nicotinic acid |
| 36 | 2-aminonaphthalene-1,5,7-disulphonic acid | I 70% II 30% | Methoxy-dichloro triazine | — | — |
| 37 | 2-aminonaphthalene-3,6,8-trisulphonic acid | I 70% II 30% | Methoxy-dichloro triazine | — | — |
| 38 | 2-aminonaphthalene-4,8-disulphonic acid | I 70% II 30% | Cyanuric Chloride | aniline | nicotinic acid |
| 39 | 2-aminonaphthalene-6-sulphonic acid | I 70% II 30% | Cyanuric Chloride | aniline-2,4-di-sulphonic acid | nicotinic acid |
| 40 | 2-aminonaphthalene-1,5-disulphonic acid | I 70% II 30% | Cyanuric Chloride | aniline N-W-methane sulphonate | nicotinic acid |
| 41 | 2-aminonaphthalene-1,5-disulphonic acid | I 80% II 20% | Cyanuric Chloride | 3-aminophenylsulphato ethylsulphone | — |
| 42 | 2-aminonaphthalene-1,5-disulphonic acid | I 80% II 20% | Cyanuric Chloride | 4-aminophenylsulphato ethylsulphone | — |
| 43 | 1-aminonaphthalene-4,8-disulphonic acid | I 80% II 20% | Cyanuric Chloride | 4,4'-diaminostilbene 2,2'-disulphonic acid | iso-nicotinc acid |
| 44 | 1-aminonaphthalene-2,5,7-trisulphonic acid | I 80% II 20% | Cyanuric Chloride | 4,4'-diaminostilbene 2,2'-disulphonic acid | iso-nicotinc acid |

I claim:

1. A water-soluble compound of formula (3) or salt thereof:

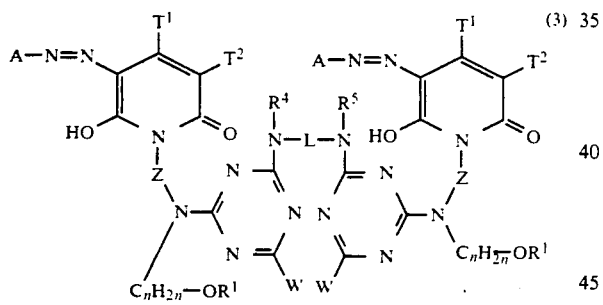

A is a phenyl or naphthyl group which is unsubstituted or substituted by one or more substituent selected from —Cl, —Br, —C$_{1-4}$-alkyl, —OH, —O—C$_{1-4}$-alkyl, —CN, —NO$_2$, —NH$_2$, —NH-COCH$_3$, sulpho and carboxy;

$T^1$ and $T^2$ are each independently H, CN, CO$_2$R$^2$, CONR$^2$R$^3$, CONR$^2$R$^3$, COR$^2$, alkyl, aralkyl, cycloalkyl or aryl;

Z is a divalent aliphatic radical containing from 2 to 6 carbon atoms;

n is from 2 to 6;

$R^1$ is H or sulpho;

$R^2$ and $R^3$ are each independently H or C$_{1-6}$-alkyl;

$R^4$ and $R^5$ are each independently H or C$_{1-4}$-alkyl or $R^4$ and $R^5$ together with N-L-N form a piperazine ring;

W is halo or quaternary ammonium; and

L is a divalent aliphatic radical containing from 2 to 6 carbon atoms, —C$_6$H$_4$.CH$_2$—, —CH$_2$C$_6$H$_4$CH$_2$—, phenylene or naphthylene, said phenylene or naphthylene being unsubstituted or substituted by nitro, sulpho, lower alkoxy, carboxy or halo, or a divalent radical of the formula:

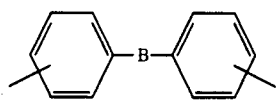

wherein B is —S—, —O—, —SO$_2$—, —CO—, —CH$_2$—, —CH$_2$CH$_2$—, —NH—, —NHCONH—, a direct link or —CH=CH—, and the phenyl rings attached to B are unsubstituted or substituted by a COOH, methyl, nitro, chloro or sulpho atom or group.

2. A compound according to claim 1 wherein L is ethylene, trimethylene, methylethylene, tetramethylene, alpha:beta-dimethylethylene, hexamethylene, —C$_6$H$_4$.CH$_2$—, —C$_2$C$_6$H$_4$CH$_2$—, 1,3- or 1,4-phenylene, 2-nitro-1,4-phenylene, 3-sulpho-1,4-phenylene, 4-methoxy-1,3-phenylene, 4-sulpho-1,3-phenylene, 4-nitro-1,3-phenylene, 2-carboxy-1,4-phenylene, 2-chloro-1,4-phenylene, 4-carboxy-1,3-phenylene, 3,7-disulpho-1,5-naphthylene, 2-methoxy-1,4-phenylene, or a group of formula:

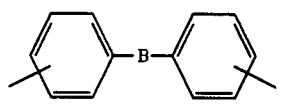

wherein B is —S—, —O—, —SO$_2$—, —CO—, —CH$_2$—, —CH$_2$CH$_2$—, —NH—, NHCONH—, a first direct link or —CH=CH—, and the phenyl rings attached to B are unsubstituted or substituted by a COOH, methyl, nitro, chloro or sulpho atom or group.

3. A compound according to claim 2 wherein L is 2,2'-disulphostilbene-4,4'-yl.

4. A compound according to claim 2 wherein $R^1$ is sulpho.

5. A compound according to claim 2 wherein Z is $-CH_2C_2-$, $-CH_2CH_2CH_2-$, $-CH_2CH(CH_3)CH_2-$ or $-CH_2CH_2CH_2CH_2CH_2-$.

6. A water-soluble compound of Formula (3) or salt thereof.

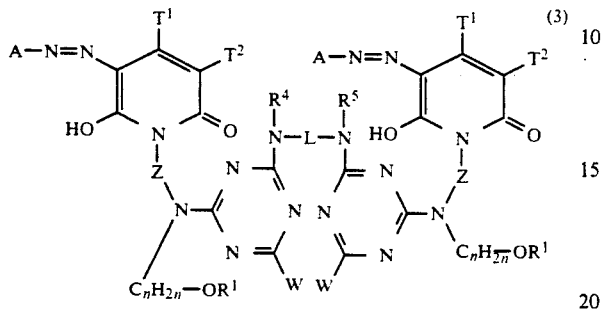
(3)

wherein:
A is phenylene or naphthylene, which is unsubstituted or substituted by a $-Cl$, $-Br$, $-C_{1-4}$-alkyl, $-OH$, $-O-C_{1-4}-$ alkyl, $-CN$, $-NO_2$, $-NH_2$, $-NHCOCH_3$, sulpho or carboxy group;
$T^1$ and $T^2$ are each independently H, CN, $CO_2R^2$, $CONR^2R^3$ or $COR^2$;
Z is $C_{1-4}$-alkylene;
n is from 2 to 6;
$R^1$ is H or sulpho;
$R^2$ and $R^3$ are each independently H or $C_{1-4}$-alkyl;
$R^4$ and $R^5$ are each independently H or $C_{1-4}$-alkyl;
W is halo, 3-carboxypyridinium or 4-carboxypyridinium; and
L is of the formula:

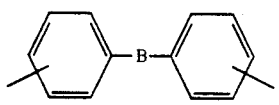

wherein B is $-S-$, $-O-$, $-SO_2-$, $-CO-$, $-CH_2-$, $-CH_2CH_2-$, $-NH-$, $NHCONH-$, a direct link or $-CH=CH-$, and the phenyl rings attached to B are unsubstituted or substituted by a COOH, methyl, nitro, chloro or sulpho atom or group.

7. A water-soluble compound of Formula (3) or salt thereof

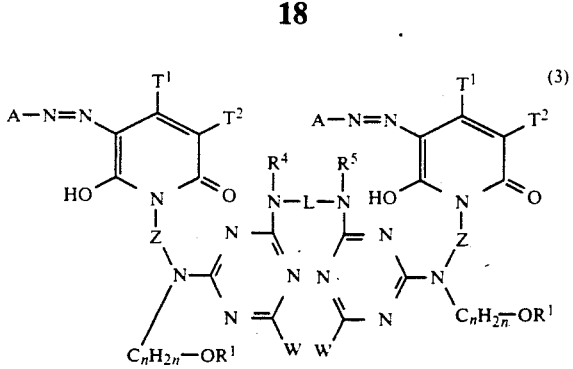
(3)

wherein:
A is phenylene or naphthylene, which is unsubstituted or substituted by a $-Cl$, $-Br$, $-C_{1-4}$-alkyl, $-OH$, $-O-C_{1-4}$-alkyl, $-CN$, $-NO_2$, $-NH_2$, $-NHCOCH_3$, sulpho or carboxy group;
$T^1$ is $C_{1-4}$-alkyl;
$T^2$ H or Cl-4-alkyl;
Z is $-CH_2CH_2-$, $-CH_2CH_2CH_2-$, $-CH_2CH_2(CH_3)CH_2-$ or $-CH_2CH_2CH_2CH_2CH_2-$;
n is from 2 to 6;
$R^1$ is sulpho;
$R^4$ and $R^5$ are each independently H or $C_{1-4}$-alkyl;
W is halo, 3-carboxypyridinium or 4-carboxypyridinium; and
L is of the formula:

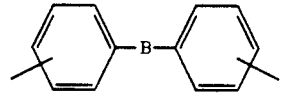

wherein B is $-S-$, $-O-$, $-SO_2-$, $-CO-$, $-CH_2-$, $-CH_2CH_2-$, $-NH-$, $NHCONH-$, a direct link or $-CH=CH-$, and the phenyl rings attached to B are unsubstituted or substituted by a COOH, methyl, nitro, chloro or sulpho atom or group.

8. A compound according to claim 7 wherein A is phenylene, naphthylene, phenylene substituted by a sulpho group or naphthylene substituted by a sulpho group.

9. A compound according to claim 7 wherein $R^1$ is sulpho.

10. A compound of Formula (6) or salt thereof

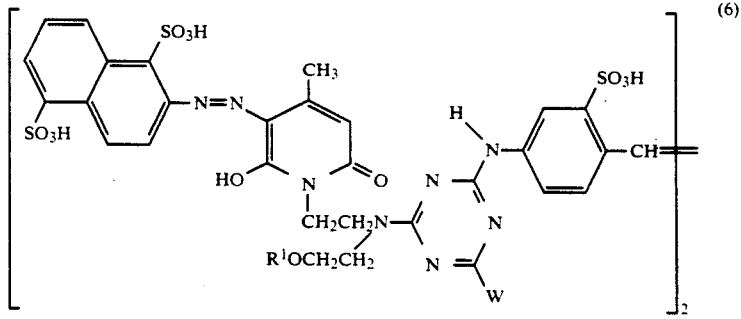
(6)

wherein
$R^1$ is H is sulpho; and
W is halo, 3-carboxypyridinium or 4-carboxypyridinium.

11. A compound according to claim 10 wherein L is 2,2'-disulphostilben-4,4'-yl.

* * * * *